United States Patent [19]

Oliveira

[11] 4,110,510

[45] Aug. 29, 1978

[54] SOUND BARRIER MATERIAL

[75] Inventor: Paul Edward Oliveira, New Bedford, Mass.

[73] Assignee: The Goodyear Tire & Rubber Company, Akron, Ohio

[21] Appl. No.: 827,036

[22] Filed: Aug. 23, 1977

[51] Int. Cl.$^2$ .............................................. B32B 17/04
[52] U.S. Cl. ................................... 428/285; 181/294;
428/109; 428/255; 428/290; 428/313; 428/425;
428/426
[58] Field of Search ............. 428/109, 110, 111, 247,
428/251, 252, 253, 255, 273, 920, 921, 310, 315,
138, 160, 245, 285, 313, 425, 290; 181/290, 294

[56] References Cited

U.S. PATENT DOCUMENTS

| | | | |
|---|---|---|---|
| 3,172,072 | 3/1965 | Willy | 428/247 |
| 3,360,422 | 12/1967 | Desch | 428/247 |
| 3,546,059 | 12/1970 | Isgur et al. | 428/921 |
| 3,647,607 | 3/1972 | Hillers | 428/247 |
| 3,733,239 | 5/1973 | George | 428/315 |
| 3,769,072 | 10/1973 | Echerd et al. | 428/921 |
| 3,778,337 | 12/1973 | Mand et al. | 428/921 |
| 3,895,983 | 7/1975 | Lang et al. | 428/315 |
| 4,038,447 | 7/1977 | Brock | 428/921 |

*Primary Examiner*—James J. Bell
*Attorney, Agent, or Firm*—J. D. Wolfe

[57] ABSTRACT

A sound barrier material comprised of a polyvinyl chloride impregnated mesh sheet having a coating of about 0.02 to 3.2 inch gauge of a barium sulfate loaded chlorinated polyethylene laminated to a foam of 1.5 to 2.5 pounds per cubic foot.

5 Claims, No Drawings

SOUND BARRIER MATERIAL

This invention relates to a relatively dimensionally stable, sound-absorbent and transmission loss sheet or barrier.

Certain equipment including piping has high noise transmission levels and consequently work areas equipped with such equipment can have noise levels that are harmful to occupants of said area. It has been desirable and customary to provide such areas with lightweight, flexible sound absorbent or transmission loss sheets or barriers to lower the noise level. The object of this invention is to provide an improved sound absorbent and transmission loss barrier or sheet capable of effectively reducing the noise level in a work area.

The noise abatement materials of this invention can be of any shape but preferably is supplied as a flexible sheet which can be readily cut and draped around the noise producing apparatus or machinery to forestall noise transmission into or through a work area. Usually the sheet is of 0.050 inch to 3.00 inch gauge that can be hung, draped, wrapped or folded to enclose the noisy machinery or pipes and can be adhered together with suitable adhesives or can be sewn together or connected with fasteners to maintain the sound barrier in the desired relationship and position relative to the noise producer.

The specific nature of this invention and its advantages can be more readily appreciated by reference to the following representative and exemplary examples wherein all parts and percentages are by weight unless otherwise designated.

EXAMPLE I

A nonflammable mesh material of 1 to 16 ounces per square yard was coated with a plasticized vinyl chloride resin to give a mesh base sheet having preferably a width of about 12 inches or more. This mesh base sheet was passed through calender rolls to apply a predetermined amount of rubbery coating composition to each side having the composition like that of the recipe of Table 1. The specific gravity of the compound is in the range of 1.50 to 2.25. The recipe is as set forth below in Table 1.

Table 1

| Ingredient, parts by weight | Recipe No. |
|---|---|
| Chlorinated polyethylene* | 100 |
| Barium sulfate | 50–200 |
| Plasticizer | 5–50 |
| Titanium dioxide | .25–10 |
| Stabilizer | 1–15 |
| Carbon black | 1–100 |

*36 to 48% $Cl_2$

The above ingredients were mixed on a conventional rubber or plastic mixer to give a mixture of uniform texture that can be applied on the calender to the mesh sheet. A sheet of polyurethane foam of about 1.5 to 2.5 and preferably 1.8 to 2.3 pounds per cubic foot was cut from a polyurethane bun having the desired density to provide a sheet of the desired thickness, usually ¼ to 1.5 inches thick.

The nonflammable mesh base sheet having a coating of the rubbery composition of the recipe, of predetermined gauge, preferably 0.02 to 3.2 inches on each face thereof, is laminated to the polyurethane sheet by placing the two sheets in contact at elevated temperature and pressure in a plate-press, press rolls or related pressure-temperature means.

A laminate made as described comprising a polyvinyl chloride impregnated nonflammable mesh sheet having predetermined gauge coating of the composition of the recipe of Table 1 laminated to a one-half inch polyurethane foam sheet, had a sound transmission class number of 28 and a noise reduction coefficient of 0.30 as measured by ASTM E90-75 and E413-73 for transmission loss and ASTM C423-66 for sound absorption.

Preferably, the barrier is nonflammable and in these cases glass fiber mats or sheets are preferred over other fabric materials. Since chlorinated polyethylene and polyvinyl chloride can degrade by generation of CHl, it is desirable that they be stabilized with suitable stabilizers such as a litharge dispersion in EPD rubber or the compounds viz., tin and barium compounds used to stabilize polyvinyl chloride.

Any of the plasticizers for polyvinyl chloride can be used in this invention but chlorinated paraffin wax, 10 to 35 percent chloride, can be used, too.

Although polyurethane foams are preferred, other foams such as polyvinyl chloride or polyethylene foams can be used in place of the polyurethane foam.

While certain representative embodiments and details have been shown for the purpose of illustrating the invention, it will be apparent to those skilled in this art that various changes and modifications may be made therein without departing from the spirit or scope of the invention.

What is claimed is:

1. A sound barrier material composed of a foam of about 1.5 to 2.5 pounds per cubic foot laminated to a polyvinyl chloride impregnated fiber sheet or mat, said sheet or mat having a coating of 0.02 to 3.2 inch gauge, said coating being chlorinated polyethylene containing barium sulfate.

2. The sound barrier of claim 1 wherein 50 to 200 parts of barium sulfate is present in each hundred parts of chlorinated polyethylene coating, said chlorinated polyethylene containing from 36 to 48 weight percent of chlorine.

3. The sound barrier of claim 1 wherein the polyvinyl chloride is stabilized with litharge and the plasticizer contains chlorinated paraffin wax.

4. The sound barrier of claim 1 wherein the foam is a polyurethane foam.

5. The sound barrier of claim 1 wherein the mat or sheet is glass fiber.